March 24, 1964 J. LEMMERICH 3,126,358
METHOD FOR IMPROVING THE BREAKDOWN STRENGTH
AND CORONA RESISTANCE OF OLEFIN POLYMERS
WITH PERHALOGENIZED HYDROCARBONS
Filed Oct. 12, 1959
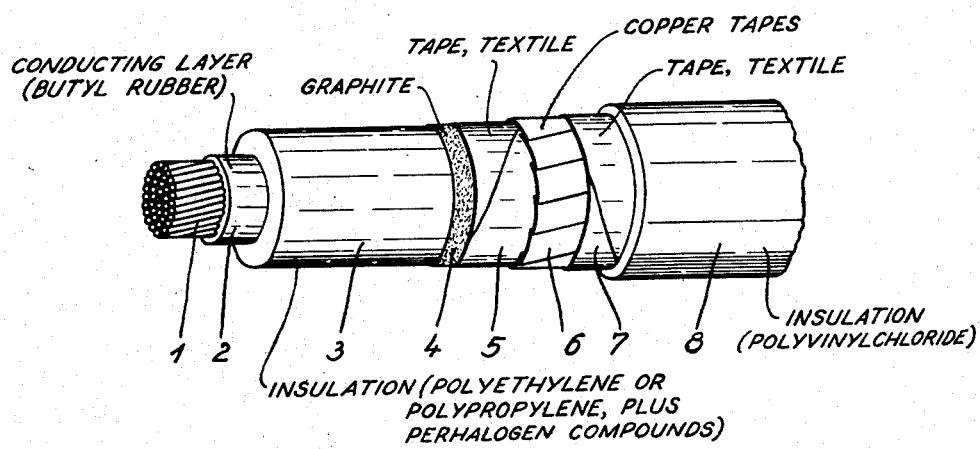

United States Patent Office 3,126,358
Patented Mar. 24, 1964

3,126,358
METHOD FOR IMPROVING THE BREAKDOWN STRENGTH AND CORONA RESISTANCE OF OLEFIN POLYMERS WITH PERHALOGENIZED HYDROCARBONS
Jost Lemmerich, Berlin-Siemensstadt, Germany, assignor to Siemens Schuckertwerke Aktiengesellschaft, Berlin-Siemensstadt, Germany, a corporation of Germany
Filed Oct. 12, 1959, Ser. No. 846,022
26 Claims. (Cl. 260—45.7)

This invention relates to olefin polymer products for dielectric or insulating purposes in general, and more particularly to olefin polymers which, like polyethylene or polypropylene, have a median or average molecular weight of 30,000 to 150,000. However, in certain cases, the invention is also applicable to high-density polyethylene up to molecular weights of 1,000,000.

The above-mentioned high polymer synthetics on the basis of olefin polymers, developed in the recent past, are being used in increasing quantity as insulating material in the electrical industries, for example for the insulation of electric cables and wires. However, the dielectric breakdown strength and corona resistivity of these substances is rather limited, which imposes a limitation upon their use for high-voltage purposes. It has been proposed therefore to improve the breakdown strength and corona resistivity of such olefin polymers by adding slight quantities of a linear-chain or branched-chain paraffin hydrocarbon of low melting point and sufficiently high boiling point. This is described in Lemmerich et al. application Serial No. 748,803, filed July 16, 1958.

It is the object of my invention to further improve the dielectric breakdown strength and corona stability of such substances so that they can be employed for high voltages economically and satisfactorily.

According to one embodiment of the invention the desired improvement in breakdown strength and corona resistivity of olefin polymers of the type mentioned above is also obtained by adding minor amounts by weight of perhalogenized hydrocarbon compounds having at least three carbon atoms, but excluding bromine and iodine, and having a melting point below 20° C. and a boiling point above 150° C. and a molecular weight below 1000.

These substances are added to the olefin polymer in quantities of 0.5 to 20 by weight, preferably 5 to 10%, the maximum concentration for a totality of any additional several components being not greater than 20%.

Suitable compounds for the purposes of the invention are, for example, 1,3 hexachlorobutadiene or a mixture of 7 parts by weight of 1,3 hexachlorobutadiene with 0.5 part hexachlorobenzene. Likewise suitable are perfluoride aliphatic compounds of the formula $C_nF_{2n+2}$, wherein $n$ is an integer between 12 and 20. Mixtures of such carbon compounds having carbon numbers within this range are also used, such as a mixture of equal parts by weight of the $C_{12}$, $C_{14}$, and $C_{16}$ compounds. Furthermore, these perfluoride compounds can be used simultaneously with 1,3 hexachlorobutadiene, such as for example a mixture consisting of 5 parts by weight of 1,3 hexachlorobutadiene and 1 part of $C_{14}F_{30}$.

Also suitable as additional substances are compounds which contain fluorine and chlorine, for example 2,3,5,6 tetrachlor 1,4 bis (trifluormethyl) benzene, and 2,3,5,6 tetrachlor 1 (trifluormethyl) 4 (pentafluorethylene) benzene of the formula:

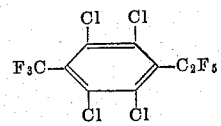

also $C_3F_2Cl_6$, $CCl_3$—$CF_2CCl_3$; $C_4F_4Cl_6$, $CCl_3$—$(CF_2)_2$—$CCl_3$ and $C_{10}F_{21}Cl$, $Cl(CF_2)_{10}F$. Compounds having up to 18 $CF_2$ groups can be employed. All these substances can be used alone or mixed with each other. They can be used together with 1,3 hexachlorobutadiene such as, for example a mixture of 5 parts of 1,3 hexachlorobutadiene and 1 part of the above-described fluorine-chlorine compounds.

Also suitable for the purposes of the invention is a low-polymerization product of the monomer trifluormonochlorethylene $C_2F_3Cl$. The polymer is comprised of 2 to 7 monomers, preferably 5 monomers. This polymer, hereinafter designated as $(C_2F_3Cl)_n$ oil, can be employed alone in the stated mixing range of 0.5 to 20%, as well as together with hexachlorobutadiene or one or more other compounds from those mentioned above.

It will be recognized that the compounds used are those in which all hydrogen atoms of the corresponding hydrocarbon are replaced by halogen atoms. The compounds consequently are constituted of carbon and halogen atoms alone.

All the described compounds and mixtures can also be used together with the addition of an alkyl benzene having a boiling point over 220° C. and a melting point below 20° C., such as dodecylbenzene.

Analogously applicable are mixtures of said perhalogenized compounds of higher melting point with high-boiling hydrocarbons, for example, dodecylbenzene, provided these mixtures have a melting point below 20° C. As example, a mixture consisting of five parts of an aliphatic perfluorided hydrocarbon compound having 18 to 20 carbon atoms on the average, of oily consistency, with a boiling point above 250° C., with five parts hexachlorobutadiene and one part hexachlorobenzene.

Also applicable are mixtures of partially halogenized hydrocarbon compounds, for example a mixture consisting of five parts 1,2,4 trichlorbenzene with one part hexachlorbenzene.

The introduction of the addition substances into the high polymer base substance, such as low or high density polyethylene or polypropylene, is preferably effected by heating the high-molecular base substance on a hot roller or calender roller above its softening point, whereafter the addition substances are added and are intimately mixed into the base substance by prolonged rolling at elevated temperature. After termination of the mixing operation and subsequent cooling, there results an insulating substance which is solid at normal room temperature (20° C.) and whose breakdown strength and corona resistivity is considerably increased in comparison with the starting product.

The insulating mixtures thus obtained can be used as cable insulation, foil material and extrusion material for extruded workpieces of all types.

An example of an electric high-voltage cable is illustrated on the drawing. The cable comprises a conductor core 1 of intertwisted round copper wires, and a conducting layer 2 of butyl rubber containing a high addition of graphite or other carbon, the insulation 3 consisting of a mixture according to the invention, a conducting layer 4 of graphite, and an overlapping tape winding 5 of graphitized textile tape. Placed upon the tape winding 5 are overlapping tapes 6 of copper, for example, an impregnated textile tape 7 also forming an overlapping winding, and an exterior sheath 8 of a mechanically resistant insulating material, for example polyvinylchloride.

*Example 1*

92.5 parts high-density polyethylene of a median molecular weight of 100,000, 7.5 parts of polymeric substance designated above as $(C_2F_3Cl)_n$ oil and having an average of 10 carbon atoms, a boiling point above 280° C., a density at 20° C. of 1.975 and a viscosity at 20° C. of 2500 cst. as described above. The mixture is intimately mixed as described above on the hot roller at 175° C. for 30 minutes.

A copper conductor was provided with an insulating sheath of 2 mm. thickness by extruding the resulting mixed product around a copper wire on a screw-type extrusion machine.

The insulated conductor, in comparison with the same conductor but with an insulation of the pure polyethylene, was found to exhibit an increase in corona resistivity of approximately 100% and an increase of the breakdown strength of 25%. The other dielectric properties, such as insulation resistance, dielectric constant, and dielectric loss factor, remain the same.

*Example 2*

92.5 parts of high-density polyethylene with a median molecular weight of 100,000,
5.0 parts dodecylbenzene,
2.5 parts of polymeric substance designated above as $(C_2F_3Cl)_n$ oil, having an average carbon number of ten carbon atoms, a boiling point above 280° C., a density at 20° C. of 1.975 and a viscosity at 20° C. of 2500 cst., are intimately mixed together as described above on the hot roller at 175° C. for 30 minutes.

*Example 3*

92.5 parts low-pressure (high-density) polyethylene of a median molecular weight of 100,000, and
7.5 parts 1,3 hexachlorobutadiene, are intimately mixed with each other as described above on the hot roller at 160° C. for one-half hour.

*Example 4*

92.5 parts high-density polyethylene of a median molecular weight of 100,000,
7.0 parts 1,3 hexachlorbutadiene, and
0.5 part hexachlorbenzene, are intimately mixed for one-half our on the hot roller at 160° C.

*Example 5*

90 parts high density polyethylene of a median molecular weight of 100,000,
9 parts of polymeric substance designated above as $(C_2F_3Cl)_n$ oil, with a carbon number of ten carbon atoms on the average, a boiling point above 280° C., a density of 1.975 at 20° C., and a viscosity of 2500 cst. at 20° C., and
0.5 part hexachlorbenzene, are all intimately mixed on the hot roller at 175° C. for one-half hour.

*Example 6*

92.5 parts high-pressure (low-density) polyethylene of a median molecular weight of 80,000, and
7.5 parts of 1,3 hexachlorobutadiene are intimately mixed for one-half hour on the hot roller at 160° C.

It is in some cases of advantage to add to the mixtures pulverulent inorganic filler substances, such as titanium dioxide, for example, or others customarily used in high-voltage techniques. The addition of inorganic filler substances is approximately 0.2 to 10%, depending upon the particular intended application. An example of such a mixture is given below:

*Example 7*

92 parts high-density polyethylene of a median molecular weight of 100,000,
3.0 parts dodecylbenzene, and
4.7 parts of 1,3 hexachlorobutadiene and 0.3 part pulverulent titanium dioxide, are all intimately mixed for one-half hour on the hot roller at 160° C.

With the mixtures according to Examples 2 to 7, an improvement of the electric properties was obtained similar to the improvements described in relation to Example 1.

The hexachlorobutadiene employed above has the formula:

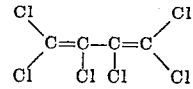

I claim:
1. A method for improving the breakdown strength and corona resistivity of a solid olefin polymer, taken from the group consisting of polyethylene and polypropylene, characterized in that there is mixed with the polymer 0.5 to 20% by weight thereof of a perhalogenized hydrocarbon compound, the compound having a melting point below 20° C., a boiling point above 150° C., and a molecular weight smaller than 1,000, the halogen of said compound being taken from the group consisting of chlorine and fluorine, the compound having at least three carbon atoms, said mixing being carried out by milling at a temperature above the softening point of the polymer, the mixture being solid at 20° C.

2. A method of improving the breakdown strength and corona resistivity of a solid olefin polymer taken from the group consisting of polyethylene and polypropylene characterized in that there is mixed with the polymer 0.5 to 20% by weight thereof of a mixture of a perhalogenized hydrocarbon compound having a melting point above 20° C., a boiling point above 150° C., and a molecular weight below 1000, the halogen of said compound being taken from the group consisting of chlorine and fluorine, the compound having at least three carbon atoms, with a high-boiling hydrocarbon having a melting point below 20° C. and a boiling point above 150° C.

3. A method of improving the insulative breakdown strength and corona resistivity of a solid polymer of a lower olefin hydrocarbon, the polymer having an average molecular weight of about 30,000 to 150,000, comprising heating the polymer to at least its softening point and mixing it with 0.5 to 20% by weight thereof of a perhalogenized hydrocarbon compound, the compound having a melting point below 20° C., a boiling point above 150° C., and a molecular weight less than 1000, the halogen of said compound being taken from the group consisting of chlorine and fluorine, the compound having at least three carbon atoms.

4. A method of improving the insulative breakdown strength and corona resistivity of polyethylene having an average molecular weight between 30,000 and 150,000, comprising heating the polymer to at least its softening point and intimately mixing therewith 0.5 to 20% by weight of hexachlorobutadiene-1,3.

5. A method of improving the breakdown strength and corona resistivity of polyethylene having an average molecular weight between 30,000 and 150,000, comprising heating the polymer to at least its softening point and intimately mixing therewith 0.5 to 20% by weight of a polymer of trifluoromonochlorethylene of the formula $(C_2F_3Cl)_n$ in which $n$ is an integer from 2 to 7.

6. A method of improving the breakdown strength and corona resistivity of polyethylene having an average molecular weight between 30,000 and 150,000, comprising heating the polymer to at least its softening point and intimately mixing therewith 0.5 to 20% by weight of a mixture of 0.5 to 10 parts of an alkyl benzene, having a boiling point above 220° C. and a melting point below 20° C., with a polymer of trifluoromonochlorethylene of the formula $(C_2F_3Cl)_n$ in which $n$ is an integer from 2 to 7.

7. A method of improving the breakdown strength and corona resistivity of polyethylene having an average molecular weight between 30,000 and 150,000, comprising heating the polymer to at least its softening point and intimately mixing therewith 0.5 to 20% by weight of a mixture of 0.5 to 10 parts of an alkyl benzene, having a boiling point above 220° C. and a melting point below 20° C., with 1,3-hexachlorobutadiene.

8. A method for improving the breakdown strength and corona resistivity of a solid olefin polymer, taken from the group consisting of polyethylene and polypropylene, characterized in that there is added to the polymer 0.5 to 20% by weight thereof of a perhalogenized hydrocarbon compound, the compound having a melting point below 20° C., a boiling point above 150° C., and a molecular weight smaller than 1,000, the halogen of said compound being taken from the group consisting of chlorine and fluorine, the compound having at least three carbon atoms, pulverulent titanium dioxide being added in an amount of 0.2 to 10% by weight of the mixture.

9. In a method of making an insulated electric conductor suitable for high voltages and of improved breakdown strength and corona resistivity, in which a sheath of insulating material is formed about the electric conductor, the following improvement: forming about said conductor a polymer taken from the group consisting of polyethylene and polypropylene to which 0.5 to 20% by weight thereof of perhalogenized hydrocarbon compound has been mixed, said compound having a melting point below 20° C.

10. In a method of making an insulated electric conductor suitable for high voltages and of improved breakdown strength and corona resistivity, in which a sheath of insulating material is formed about the electric conductor, the following improvement: forming about said conductor a polymer taken from the group consisting of polyethylene and polypropylene having intimately admixed therewith 0.5 to 20% by weight thereof of a perhalogenized hydrocarbon compound, the compound having a melting point below 20° C., a boiling point above 150° C., and a molecular weight smaller than 1,000, the halogen of said compound being taken from the group consisting of chlorine and fluorine, the compound having at least three carbon atoms, said mixing being carried out by milling at a temperature above the softening point of the polymer, the mixture being solid at 20° C.

11. In a method of making an insulated electric conductor suitable for high voltages and of improved breakdown strength and corona resistivity, in which a sheath of insulating material is formed about the electric conductor, the following improvement: forming about said conductor a polymer taken from the group consisting of polyethylene and polypropylene having intimately admixed therewith 0.5 to 20% by weight thereof of a mixture of a perhalogenized hydrocarbon compound having a melting point above 20° C., a boiling point above 150° C., and a molecular weight below 1000, the halogen of said compound being taken from the group consisting of chlorine and fluorine, the compound having at least three carbon atoms; with a high-boiling hydrocarbon having a melting point below 20° C. and a boiling point above 150° C.

12. The method defined in claim 9, the polymer being polyethylene having an average molecular weight between 30,000 and 150,000, the perhalogenized compound being a polymer of trifluoromonochlorethylene of the formula $(C_2F_3Cl)_n$, in which $n$ is an integer from 2 to 7.

13. The method defined in claim 9, the polymer being polyethylene having an average molecular weight between 30,000 and 150,000, the perhalogenized compound being hexachlorobutadiene-1,3.

14. In a method of making an insulated electric conductor suitable for high voltages and of improved breakdown strength and corona resistivity, in which a sheath of insulating material is formed about the electric conductor, the following improvement: forming about said conductor a polymer of a lower olefin hydrocarbon having an average molecular weight of about 30,000 to 150,000, having intimately admixed therewith 0.5 to 20% by weight thereof of a perhalogenized hydrocarbon compound, the compound having a melting point below 20°, boiling point above 150° C., and a molecular weight less than 1000, the compound having at least three carbon atoms, said mixing being carried out by rolling at a temperature above the softening point of the polymer, the mixture being solid at 20° C., said compound being taken from the group consisting of hexachlorobutadiene-1,3; a polymer of trifluormonochlor ethylene of the formula $(C_2F_3Cl)_n$, in which $n$ is an integer from 2 to 7; a perfluorided aliphatic hydrocarbon of the formula $C_2F_{2n+2}$, in which $n$ is an integer from 12 to 20; and a compound containing both fluorine and chlorine, and being taken from the group consisting of 2,3,5,6 tetrachlor-1,4 bis (trifluormethyl) benzene; 2,3,5,6-tetrachlor-1 (trifluormethyl) 4 (pentafluorethylene) benzene; $C_3F_2Cl_2$; $CCl_3-CF_2CCl_3$;

$$C_4F_4Cl_6;\ CCl_3-(CF_2)_2-CCl_3;\ C_{10}F_{21}Cl$$

and $Cl(CF_2)_{10}F$.

15. In a method of making an insulated electric conductor suitable for high voltages and of improved breakdown strength and corona resistivity, in which a sheath of insulating material is formed about the electric conductor, the following improvement: forming about said conductor a polymer taken from the group consisting of polyethylene and polypropylene to which 0.5 to 20% by weight thereof of perhalogenized hydrocarbon compound has been mixed, said compound having a melting point below 20° C., a boiling point above 150° C., and a molecular weight less than 1000, the halogen of said compound being taken from the group consisting of chlorine and fluorine, the compound having at least three carbon atoms, said mixing being carried out by rolling at a temperature above the softening point of the polymer, the mixture being solid at 20° C., said compound being taken from the group consisting of hexachlorobutadiene-1,3; a polymer of trifluormonochlor ethylene of the formula $(C_2F_3Cl)_n$, in which $n$ is an integer from 2 to 7; a perfluorided aliphatic hydrocarbon of the formula $C_2F_{2n+2}$, in which $n$ is an integer from 12 to 20; and a compound containing both fluorine and chlorine, and being taken from the group consisting of 2,3,5,6 tetrachlor-1,4 bis (trifluormethyl) benzene; 2,3,5,6-tetrachlor-1 (trifluormethyl) 4 (pentafluorethylene) benzene; $C_3F_2Cl_2$; $CCl_3-CF_2CCl_3$; $C_4F_4Cl_6$; $CCl_3-(CF_2)_2-CCl_3$; $C_{10}F_{21}Cl$; and $$Cl(CF_2)_{10}F$$

16. In an insulated electric device suitable for high voltages, comprising an electric conductor means and an electric insulator in insulating proximity thereto, the following improvement serving to provide improved breakdown strength and improved corona resistivity: said conductor means being insulated with a polymer taken from the group consisting of polyethylene and polypropylene with which 0.5 to 20% by weight of perhalogenized hydrocarbon compound having a melting point below 20° C., a boiling point above 150° C., and a molecular weight below 1000 has been intimately admixed, the halogen of said compound being taken from the group consisting of chlorine and fluorine, the compound having at least three carbon atoms, the mixture being solid at 20° C.

17. The insulated device defined in claim 16, the compound being hexachlorobutadiene-1,3.

18. The insulated device defined in claim 16, the compound being a polymer of trifluoromonochlorethylene of the formula $(C_2F_3Cl)_n$, in which $n$ is an integer from 2 to 7.

19. The insulated device defined in claim 16, said compound being taken from the group consisting of hexachlorobutadiene-1,3; a polymer of trifluormonochlor ethylene of the formula $(C_2F_3Cl)_n$, in which $n$ is an integer from 2 to 7; a perfluorided aliphatic hydrocarbon of the formula $C_2F_{2n+2}$, in which $n$ is an integer from 12 to 20; and a compound containing both fluorine and chlorine, and being taken from the group consisting of 2,3,5,6 tetrachlor-1,4 bis (trifluormethyl) benzene; 2,3,5,6- tetrachlor-1 (trifluormethyl) 4 (pentafluorethylene) benzene; $C_3F_2Cl_2$; $CCl_3$—$CF_2CCl_3$; $C_4F_4Cl_6$;

$$CCl_3-(CF_2)_2-CCl_3; C_{10}F_{21}Cl$$

and $Cl(CF_2)_{10}F$.

20. In an insulated electric device suitable for high voltages, comprising an electric conductor means and an electric insulator in insulating proximity thereto, the following improvement serving to provide improved breakdown strength and improved corona resistivity: said conductor means being insulated with a polymer of a lower olefin hydrocarbon, having an average molecule weight of about 30,000 to 150,000 with which 0.5 to 20% by weight of perhalogenized hydrocarbon compound having a melting point below 20° C., a boiling point above 150° C., and a molecular weight below 1000 has been intimately admixed, the halogen of said compound being taken from the group consisting of chlorine and fluorine, the compound having at least three carbon atoms, the mixture being solid at 20° C.

21. The method defined in claim 9, for making insulated high voltage cable and wire conductors, the forming constituting an extrusion about the conductor.

22. An insulated conductor made as defined in claim 21.

23. A method of improving the insulative breakdown strength and corona resistivity of a solid polymer of a lower olefin hydrocarbon, the polymer having an average molecular weight of about 30,000 to 150,000, comprising heating the polymer to at least its softening point and mixing it with 0.5 to 20% by weight thereof of a perhalogenized hydrocarbon compound, the compound having a melting point below 20° C., a boiling point above 150° C., and a molecular weight less than 1000, said compound being a perfluorided aliphatic hydrocarbon of the formula $CnF_{2n+2}$, in which $n$ is in integer from 12 to 20.

24. A method of improving the insulative breakdown strength and corona resistivity of a solid polymer of a lower olefin hydrocarbon, the polymer having an average molecular weight of about 30,000 to 150,000, comprising heating the polymer to at least its softening point and mixing it with 0.5 to 20% by weight thereof of a perhalogenized hydrocarbon compound, the compound having a melting point below 20° C., a boiling point above 150° C., and a molecular weight less than 1000, said compound containing both fluorine and chlorine, and being taken from the group consisting of 2,3,5,6 tetrachlor-1,4-bis (trifluormethyl) benzene; 2,3,5,6 tetrachlor-1(trifluormethyl) 4 (pentafluorethylene) benzene; $C_3F_2Cl_2$; $CCl_3$—$CF_2CCl_3$; $C_4F_4Cl_6$; $CCl_3$—$(CF_2)_2$—$CCl_3$; $C_{10}F_{21}Cl$; and $Cl(CF_2)_{10}F$.

25. An insulated electric conductor of improved breakdown strength and corona resistivity, the conductor being insulated with a polymer taken from the group consisting of polyethylene and polypropylene with which 0.5 to 20% by weight of perhalogenized hydrocarbon compound having a melting point below 20° C., a boiling point above 150° C., and a molecular weight below 1,000 has been intimately admixed, the halogen of said compound being taken from the group consisting of chlorine and fluorine, the compound having at least three carbon atoms, the mixture being solid at 20° C., said compound being taken from the group consisting of hexachlorbutadiene-1,3; a polymer of trifluormonochlor ethylene of the formula $(C_2F_3Cl)_n$, in which $n$ is an integer from 2 to 7; a perfluorided aliphatic hydrocarbon of the formula $C_2F_{2n+2}$, in which $n$ is an integer from 12 to 20; and a compound containing both fluorine and chlorine, and being taken from the group consisting of 2,3,5,6 tetrachlor-1,4 bis (trifluormethyl) benzene; 2,3,5,6 tetrachlor-1 (trifluormethyl) 4 (pentafluorethylene) benzene; $C_3F_2Cl_2$; $CCl_3$—$CF_2CCl_3$; $C_4F_4Cl_6$;

$$CCl_3-(CF_2)_2-CCl_3$$

$C_{10}F_{21}Cl$; and $Cl(CF_2)_{10}F$.

26. A method of making an insulated electric conductor of improved breakdown strength and corona resistivity comprising providing an insulating layer of a polymer for the electric conductor, said polymer being taken from the group consisting of polyethylene and polypropylene to which 0.5 to 20% by weight thereof of perhalogenized hydrocarbon compound has been mixed, said compound having a melting point below 20° C., a boiling point above 150° C., and a molecular weight less than 1000, the halogen of said compound being taken from the group consisting of chlorine and fluorine, the compound having at least three carbon atoms, said mixing being carried out by rolling at a temperature above the softening point of the polymer, the mixture being solid at 20° C., said compound being taken from the group consisting of hexachlorobutadiene-1,3; a polymer of trifluormonochlor ethylene of the formula $(C_2F_3Cl)_n$, in which $n$ is an integer from 2 to 7; a perfluorided aliphatic hydrocarbon of the formula $C_2F_{2n+2}$, in which $n$ is an integer from 12 to 20; and a compound containing both fluorine and chlorine, and being taken from the group consisting of 2,3,5,6 tetrachlor-1,4 bis (trifluormethyl) benzene; 2,3,5,6-tetrachlor-1 (trifluormethyl) 4 (pentafluorethylene) benzene; $C_3F_2Cl_2$; $CCl_3$—$CF_2CCl_3$; $C_4F_4Cl_6$; $CCl_3$—$(CF_2)_2$—$CCl_3$; $C_{10}F_{21}Cl$; and $Cl(CF_2)_{10}F$.

References Cited in the file of this patent

UNITED STATES PATENTS

| | | |
|---|---|---|
| 2,766,136 | Gray | Oct. 9, 1956 |
| 2,766,299 | Schaff | Oct. 9, 1956 |
| 2,894,042 | Miller | July 7, 1959 |
| 2,922,824 | Honn et al. | Jan. 26, 1960 |
| 2,951,096 | Miller | Aug. 30, 1960 |
| 2,967,164 | Aries | Jan. 3, 1961 |
| 2,980,964 | Dilke | Apr. 25, 1961 |

FOREIGN PATENTS

| | | |
|---|---|---|
| 750,923 | Great Britain | June 20, 1956 |
| 559,929 | Italy | Mar. 28, 1957 |

OTHER REFERENCES

Raff et al.: "Polyethylene," 1956, pages 258–59; Interscience Publishers Inc., New York, New York.